Patented Mar. 15, 1949

2,464,480

UNITED STATES PATENT OFFICE

2,464,480

HYDROCARBON SYNTHESIS

Roland A. Beck, Fishkill, and Eugene E. Sensel and Alfred J. Millendorf, Beacon, N. Y., assignors to The Texas Company, New York, N. Y., a corporation of Delaware No Drawing. Application December 3, 1946, Serial No. 713,844

7 Claims. (Cl. 260—449.6)

The present invention relates to the catalytic interaction between carbon oxide and hydrogen whereby liquid hydrocarbons are formed, and is more particularly concerned with maintenance of catalytic activity throughout an extended period of time.

It is well known that the reaction between carbon monoxide and hydrogen may be carried out at an elevated temperature in the presence of the familiar catalysts for this reaction with the direct production of hydrocarbons which are predominantly, normally liquid in character. It is, however, important to maintain the reaction temperature within selected narrow limits of operation in order to obtain the desired products. For example, when using a selected catalyst under given conditions of charge, space velocity, pressure, and the like, there will be a narrow optimum range of temperatures at which a maximum yield of liquid hydrocarbons is produced. At higher temperatures, all other conditions being the same, the yield of liquid hydrocarbons will decrease and the amount of gaseous conversion products will increase. On the other hand, at lower temperatures the percentage conversion will be materially reduced.

After a usually prolonged period of operation, however, the activity of the catalyst, as indicated by a decrease in yield, particularly of liquid hydrocarbons, progressively declines. This loss of activity is to be distinguished from that occasioned by carbonaceous and other surface deposits, and capable of being overcome by conventional steps of regeneration and revivification involving removal of such surface deposits, reworking of the catalyst, removal of catalyst poisons and the like. In short, it may and usually does occur in spite of such conventional regenerating and revivification processes.

Such decline in activity may be overcome by raising the temperature level of the catalyst somewhat, as for example, 9 to 18° F., but as indicated above there is usually an accompanying increase in gaseous hydrocarbon reaction products at the expense of liquid hydrocarbons. Moreover, in the case of a typical cobalt catalyst, an increase of from 35 to 40° F. is all that can be tolerated before the desired product distribution is altered so that normally gaseous hydrocarbons exceed the liquid products, and by-product carbon dioxide predominates over water vapor.

It is an object of the present invention to overcome the foregoing disadvantages by providing a method of operation whereby product yield is maintained and product distribution held relatively constant to the end that catalyst life is materially prolonged beyond the time when discarding would normally be in order. A further object contemplates an operation as above wherein the range of temperatures at which high yields of selected liquid products may be obtained is materially extended.

In accordance with the present invention it has been discovered that it is possible to maintain a high level of catalyst activity with relatively constant product distribution by periodically or progressively, as activity tends to diminish, incorporating in the catalyst an alkali metal compound, in sufficient quantity, at least, to increase the proportion of alkali metal over the maximum present in the catalyst during any previous period of operation, while concurrently raising the operating temperature to a new level where an increased catalytic activity results. The alkali metal compound is preferably alkaline in reaction and if it is a salt, it contains an acid radical which is innocuous with respect to the activity of the catalyst. As examples of the types of compounds that are included within the scope of the invention there may be mentioned the alkali metal, particularly sodium, carbonates, bicarbonates, hydroxides, formates, acetates, citrates, fluorides, borates, aluminates, tungstates, and the like. Since the carbonates are readily available and produce excellent results, it is preferred to use these compounds.

The incorporation of the alkali metal compounds may be accomplished in any convenient manner. For example, an aqueous solution thereof may be sprayed upon the particles of catalyst from a number of points so as to distribute the solution uniformly on the catalyst surface. This may be followed by drying and thereafter by resumption of the catalytic reaction. Alternatively, there may be poured over the catalyst, a solution of the alkali metal compound of such strength that the quantity which will be retained by contact mass contains the selected addition of alkali. Drying is likewise advisable before subsequent use.

The invention is particularly advantageous in the case of a catalyst operating under the well known conditions of dense phase fluidization where, in the finely divided or powdered form, its particles are buoyed up or suspended in the upflowing gaseous reactants. Thus aerated, the catalyst particles, as is well known, vibrate in a random pattern so that a condition of physical uniformity and mixture tends to prevail throughout the contact mass. Even under reaction conditions, a solution of alkali metal compound sprayed into the stream of reactant feed gases is readily absorbed and evenly distributed on the contact mass, and at the high temperatures normally prevailing, seems to dry instantaneously. Accordingly, the controlled introduction, preferably as a spray, of any selected aqueous solution of alkali metal compound into the feed gases, affords an ideal means for adding alkali metal to a fluidized catalyst mass.

The preferred catalysts to which the present invention pertains are those comprising metallic cobalt, together with a promoter such as one or more of the oxides of thorium, magnesium, uranium, manganese and vanadium on a suitable supporting material, particularly a silicious material, such as diatomaceous earth, silica gel, or various clays. The catalysts may be prepared by making up an aqueous solution of a mixture of suitable compounds such as the nitrates, acetates, and formates of the metals to be employed as such or as the oxides, mixing the support with the solution, and then precipitating the metals as the carbonates by adding a suitable alkali metal carbonate. After drying, the catalyst, if it is to be used in a fixed bed reaction, is formed into pellets or granules in any suitable manner. Thereafter, prior to use in the reaction, the catalyst is reduced in a stream of hydrogen or hydrogen-containing gases to convert the catalytic metal largely to the free state.

Moreover, alkali metal compounds may form a valuable constituent of the catalyst. These may be incorporated in the catalyst by using an excess of sodium carbonate, for example, to precipitate the metallic nitrates, in the foregoing process of catalyst preparation, and then controlling washing so as to retain the desired amount of alkali metal. Alternatively, the sodium carbonate may be directly added to the exhaustively washed catalyst.

The present invention is applicable either to a catalyst having an initial selected alkali metal content or to one free therefrom. In either case, about 3% of alkali metal based on the weight of cobalt in the catalyst represents the typical upper limit beyond which the alkali content cannot be raised without encountering results that are distinctly disadvantageous. Therefore, when operating in accordance with the present invention, it is advisable to start with a catalyst having an alkali metal content as far below this limit as possible. In fact, a catalyst free or substantially free of alkali metal gives the widest range of permissible alkali addition and is to be preferred where it gives the desired initial product distribution.

Advantageously, incorporation of additional alkali metal compound in the catalyst should be deferred until the activity of the catalyst has diminished to an objectionable extent. If additions of alkali metal compound are made at more frequent intervals the aforementioned condition of limiting alkali content is earlier approached. It will be obvious, however, that the frequency of alkali addition resolves itself into a mere economic operating balance between the decrease in catalytic activity which can be tolerated, and availability of catalyst replacement. In any event, the present invention permits a longer catalyst life at higher activity than heretofore.

The addition of alkali metal compound need only be sufficient to increase the proportion of alkali metal over any previous maximum proportion. This normally, in the case of a cobalt catalyst, means simply an increase over that contained in the catalyst before the addition. However, in the case of other catalysts, such as iron, operating under higher temperatures and in other cases after extended periods of continuous use, there may be a decrease in alkali content due to migration or loss from the reaction zone. The present invention contemplates incorporation of sufficient alkali metal compound to compensate for this loss and to provide a substantial addition.

For example, the addition may amount to about 0.30 to 0.40 per cent based on the weight of the alkali metal as referred to the weight of the cobalt. However, within the range from 0.10 per cent up to the limit dictated by the above discussed limiting alkali metal content, improved results are observed.

As is true with respect to any catalyst for this reaction, the optimum reaction temperature should be determined prior to continuing the reaction for any extended period of time by making short tests at various temperatures preferably with representative samples of the catalyst. In general, the cobalt type of catalysts produce optimum results at temperatures varying from about 360° F. to about 460° F. In other words, the optimum narrow temperature range for a given catalyst will usually fall some place within these limits, and, as indicated above, will be an increasingly higher value as the proportion of alkali metal in the catalyst increases.

For example, with an alkali metal addition of about 0.3 to 0.4 per cent, as mentioned above, and with a typical cobalt catalyst, the required increase in temperature to reach the new optimum range is generally about 9 to 18° F. More or less comparable temperature alterations accompanying varying additions of alkali metal compound.

In order that the invention may be understood more fully, reference will be had to the following example: A cobalt catalyst was prepared as follows:

1975 grams of cobalt nitrate, $Co(NO_3)_2 \cdot 6H_2O$, 26.1 grams of thorium nitrate, $Th(NO_3)_4 \cdot 4H_2O$, and 867 grams of Filter-Cel (a diatomaceous earth) are mixed with sufficient water to make up five liters of aqueous mixture. Thereafter, 375 cc. of a magnesium nitrate solution prepared by dissolving 222 grams of magnesium oxide in 750 cc. of nitric acid plus sufficient water to make a volume of two liters is added to the mixture. After stirring for one-half hour, the metals are precipitated in the form of the carbonates by the slow addition of a ten per cent sodium carbonate solution in an amount sufficient to effect complete precipitation. The resulting mixture of precipitates and support is filtered and washed ten times with five liters of water each time. The mass is dried to a water content of about 10 per cent, ground to 40 mesh and pelleted in a conventional pelleting machine having $\frac{3}{32}$ inch dies.

The catalyst prepared as above described is reduced in a stream of hydrogen at a temperature of about 660° F., and a space velocity of about 100 (100 volumes of hydrogen per hour per volume of catalyst) for 24 hours. The catalyst is then conditioned by a stream of synthesis gas consisting of a mixture of carbon monoxide and hydrogen in a 1:2 molecular proportion, for six hours, starting at a temperature of about 300° F. and concluding at the temperature gradually raised to about 392° F.

The reduced and conditioned catalyst, having a bulk density of 0.45 g./cc., is used in a reaction by passing a charge of synthesis gas consisting of carbon monoxide and hydrogen in the respective molar ratio of 1:2, at a space velocity of 100 (100 volumes of charge gas per hour per volume of catalyst), in contact with the catalyst at a temperature of 392° F. and at atmospheric pressure. The products are collected and analyzed with results approximately as follows:

| Weight per cent of synthesis gas converted to— | | | | | |
|---|---|---|---|---|---|
| Hydrocarbons | | | | | Unconverted |
| Liquid | Gaseous | | $H_2O$ | $CO_2$ | |
| | $CH_4$ plus $C_2$'s | Heavier than $C_2$'s | | | |
| 30 | 5 | 5 | 49 | 9 | 2 |

During a continuous period of operation of about 336 hours, under the above conditions, the catalyst activity progressively diminishes until the product yield and distribution is as follows:

| Weight per cent of synthesis gas converted to— | | | | | |
|---|---|---|---|---|---|
| Hydrocarbons | | | | | Unconverted |
| Liquid | Gaseous | | $H_2O$ | $CO_2$ | |
| | $CH_4$ plus $C_2$'s | Heavier than $C_2$'s | | | |
| 24 | 4 | 4 | 40 | 6 | 22 |

At this point the reaction is terminated, and the catalyst is cooled and uniformly mixed with 1500 cc. of water containing 3.0 grams of sodium carbonate. The pellets are dried to a water content of about ten per cent and again subjected to passage of synthesis gas under the same conditions as before except that the reaction temperature is held at about 405° F. The product yield and distribution was as follows:

| Weight per cent of synthesis gas converted to— | | | | | |
|---|---|---|---|---|---|
| Hydrocarbons | | | | | Unconverted |
| Liquid | Gaseous | | $H_2O$ | $CO_2$ | |
| | $CH_4$ plus $C_2$'s | Heavier than $C_2$'s | | | |
| 28 | 6 | 6 | 48 | 10 | 2 |

The foregoing addition of sodium carbonate actually adds about 0.35% sodium based upon the weight of cobalt in the catalyst. After an extended period of operation when the catalyst activity has diminished in the order indicated above, a sodium carbonate addition is made in the same manner as above and the process resumed with a reaction temperature increase of about 12° F. Thus, for example, after the third addition of sodium carbonate (with an alkali content of about 1.05% on the foregoing basis) the product yield and distribution at a reaction temperature of 428° F. is as follows:

| Weight per cent of synthesis gas converted to— | | | | | |
|---|---|---|---|---|---|
| Hydrocarbons | | | | | Unconverted |
| Liquid | Gaseous | | $H_2O$ | $CO_2$ | |
| | $CH_4$ plus $C_2$'s | Heavier than $C_2$'s | | | |
| 26 | 7 | 7 | 45 | 12 | 3 |

This procedure may be continued until the alkali metal content, on the above basis, reaches about 2.85% with an operating temperature of about 480° F. At this point, however, permanent loss of activity has usually set in so that it may be advisable to discard the catalyst at a somewhat lower alkali metal content depending upon the economic availability of replacement catalyst.

If, in the foregoing example, the reaction temperature is increased without an alkali metal addition, there would be a decrease in yield of liquid hydrocarbons with an excessive increase in gaseous products, particularly carbon dioxide and methane. Obviously, therefore, the present invention prolongs the effective life of the catalyst, while maintaining the desired yields.

As indicated above, it is not necessary to start with a catalyst which is free of alkali metal. On the contrary, we may commence the reaction with a catalyst containing for example 0.58% or 1.20% alkali metal (on the above basis) as taught in the aforementioned application, Serial No. 528,004, now Patent 2,437,051, with additions of alkali metal compound at successive periods as activity diminishes. Initial reaction temperature will be 410° and 428° F., respectively, for the two starting catalysts following the method of preparation outlined in the previous example.

In general the amount of alkali metal compound to be added, at each step, is the minimum addition which will permit the required increase in activity. Where activity is permitted to deteriorate to a greater extent than in the previous example, a relatively greater addition may be necessary. These statements, however, refer to optimum operation, and where full resumption of catalytic activity is not desired, lesser additions will suffice.

It will be understood that the foregoing examples are merely illustrative of specific application of the invention and that other alkali metals and their compounds are contemplated, such as potassium, lithium, cesium, and rubidium compounds, especially the carbonates.

While the use of cobalt catalysts forms a preferred embodiment of the invention, it is not so limited, and in its broadest aspect is operable to some extent with all familiar Fischer catalysts, such, for example as other metals of the iron group, notably iron itself, nickel and ruthenium, together with any conventional promoters and activators. The catalyst metal may be either unsupported or else supported on any typical carrier such as silica gel, diatomaceous earth or the like.

It is to be understood, of course, that the temperatures and proportions of alkali metal given above for purposes of example, will necessarily be modified to those characteristically optimum for the alternative catalysts of the broad invention. Thus, in the case of a typical iron catalyst the initial reaction temperature will be about 600° F. at a pressure of about 200 pounds per square inch gauge. Additions of alkali metal compound and subsequent operating temperature will be made on this basis. As is true with respect to any catalyst for this reaction, the amount of the addition and the optimum operating temperature are best determined by advance testing of a catalyst sample.

The invention is applicable not only to the fixed bed and "fluid" catalyst operations mentioned above but also to foam type reactions and reactions wherein the catalyst is suspended in or continuously rinsed by a liquid vehicle such as a "proper oil" or water. When water is used as the suspending vehicle, the required addition of alkali metal can advantageously be made by simply increasing the alkalinity of the water.

The method may be varied within wide limits, including the proportions of carbon monoxide and hydrogen, reaction pressure, space velocity, etc., since the effect of the addition of the alkali metal compound is apparently independent of variables other than temperature.

Obviously many modifications and variations of the invention as hereinbefore set forth may be made without departing from the spirit and scope thereof and therefore only such limitations should be imposed as are indicated in the appended claims.

We claim:

1. In a process for the reaction of carbon monoxide and hydrogen to produce hydrocarbons wherein the reaction is carried out at an elevated temperature in the presence of a hydrocarbon synthesis catalyst and the selectivity of the catalyst for the production of normally liquid hydrocarbons is favorably affected by a minor alkali metal content of the catalyst and tends to decrease with use; the improvement which comprises adding alkali metal compound effective to increase said selectivity to the catalyst after a period of use; and increasing the reaction temperature to substantially that at which the maximum yield of liquid hydrocarbons is obtained with the resulting catalyst.

2. A process as defined in claim 1 wherein the catalyst comprises a metal of the iron group of the Periodic Table.

3. A process as defined in claim 1 wherein the catalyst comprises cobalt with an initial alkali metal content substantially below 3 per cent by weight based on the weight of the metallic cobalt.

4. A process as defined in claim 3 wherein the initial catalyst has substantially no alkali metal content.

5. In a process for the reaction of carbon monoxide and hydrogen to produce hydrocarbons wherein the reaction is carried out at an elevated temperature in the presence of a hydrocarbon synthesis catalyst and the selectivity of the catalyst for the production of normally liquid hydrocarbons is favorably effected by a minor alkali metal content of the catalyst and tends to decrease with use; the improvement which comprises maintaining the selectivity of the catalyst during use by simultaneously supplementing the alkali metal content of the catalyst and increasing the reaction temperature as the selectivity tends to decline.

6. In a process for the reaction of carbon monoxide with hydrogen to produce a liquid hydrocarbon product wherein the reaction is carried out at an elevated temperature in the presence of a catalyst of the iron group having a relatively minor alkali metal content, and wherein said alkali metal content favorably influences the yield of said product and said yield tends to decline with use of said catalyst, the improvement which comprises progressively adding a compound of said alkali metal effective to supplement said alkali metal content to the reaction zone into contact with the catalyst during continued use, and increasing the reaction temperature within said reaction zone such that the yield of said product is substantially maintained.

7. A process as defined in claim 6 wherein the alkali metal compound is supplied to the reaction zone as a spray of a solution of said compound.

ROLAND A. BECK.
EUGENE E. SENSEL.
ALFRED J. MILLENDORF.

REFERENCES CITED

The following references are of record in the file of this patent:

UNITED STATES PATENTS

| Number | Name | Date |
| --- | --- | --- |
| 2,257,457 | Fischer et al. | Sept. 30, 1941 |
| 2,283,173 | Bates | May 19, 1942 |
| 2,395,875 | Kearby | Mar. 5, 1946 |
| 2,408,139 | Gutzeit | Sept. 24, 1946 |